Nov. 21, 1939.  F. STEBLER  2,180,559
FRUIT SIZER
Filed Sept. 28, 1936  2 Sheets-Sheet 1
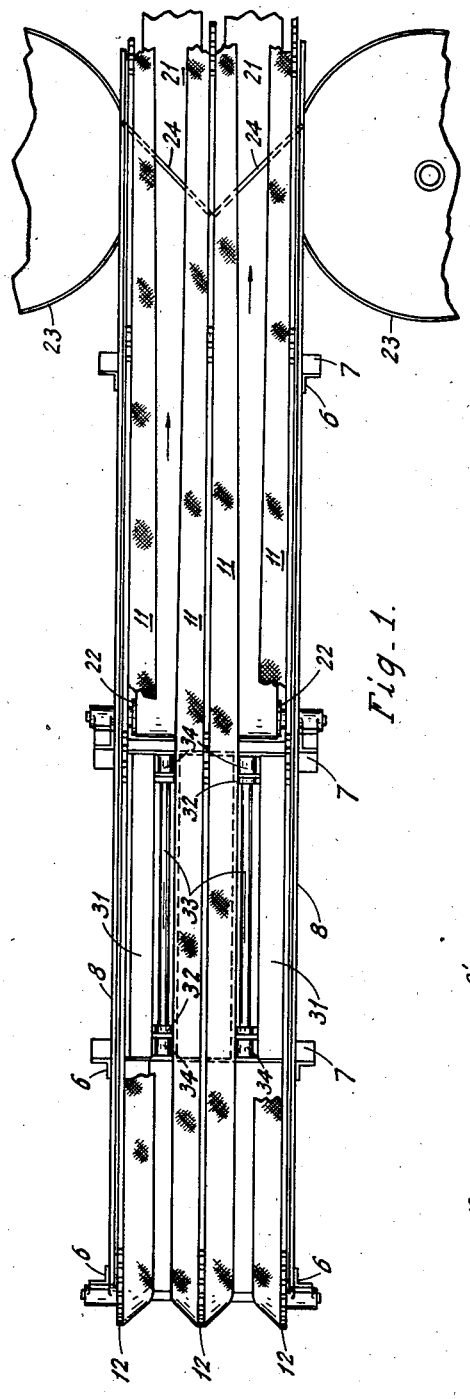
INVENTOR.
Fred Stebler
BY Philip G. Minnis
ATTORNEY Nov. 21, 1939.   F. STEBLER   2,180,559
FRUIT SIZER
Filed Sept. 28, 1936   2 Sheets-Sheet 2
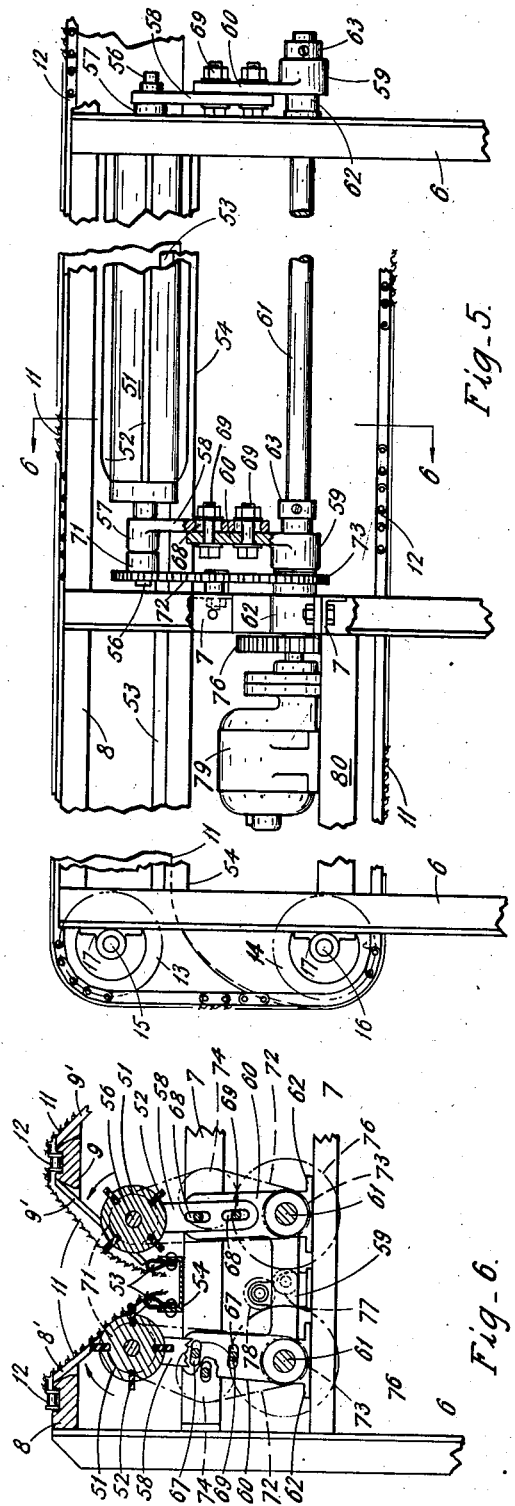
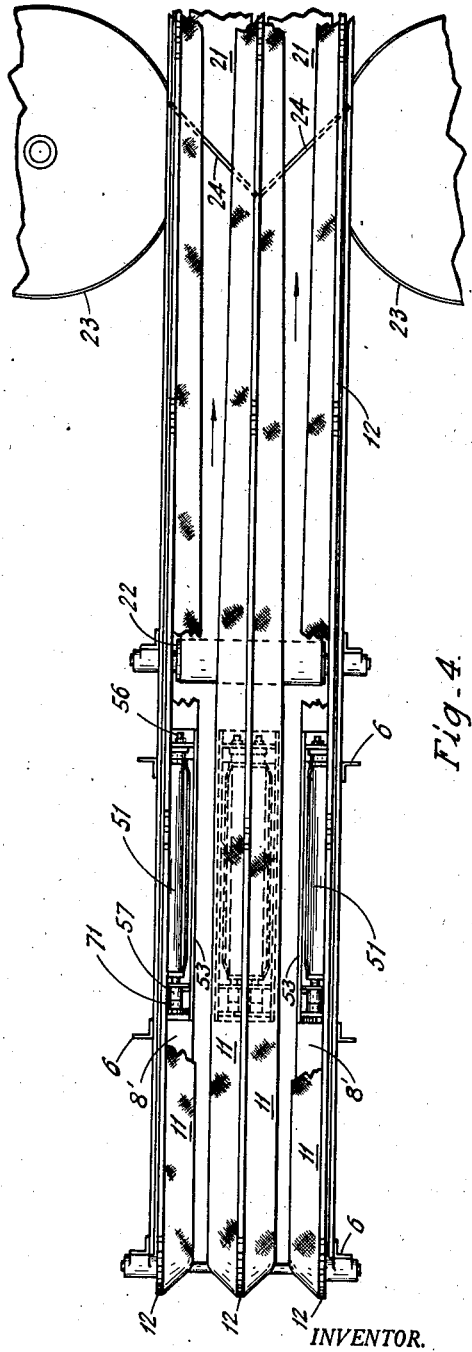
INVENTOR.
Fred Stebler.
BY
ATTORNEY.

Patented Nov. 21, 1939

2,180,559

UNITED STATES PATENT OFFICE 2,180,559

FRUIT SIZER

Fred Stebler, Riverside, Calif., assignor to Food Machinery Corporation, San Jose, Calif., a corporation of Delaware Application September 28, 1936, Serial No. 102,866

9 Claims. (Cl. 209—102)

The present invention relates generally to the grading art, and is particularly concerned with improvements in apparatus for grading articles such as fruit and the like according to size.

A general object of the invention is to provide a grading apparatus of improved construction to enable more accurate sizing of fruits having a more or less elongated shape such as pears, lemons, certain varieties of apples, etc., or other similarly shaped articles.

Another object of the invention is to provide an improved sizing machine for fruit or the like such as referred to, in which the fruit is automatically positioned properly for the sizing operation.

A further object of the invention is to provide an improved sizing machine for elongated shaped fruit and the like which operates to uniformly position all the fruit delivered to it so that the fruit will be sized according to its smallest diameter.

Further objects will be apparent from the following description of preferred embodiments of the invention, taken in connection with the accompanying drawings wherein like reference characters denote like parts throughout the several views.

In the drawings:

Fig. 1 is a plan view of the feed end of a fruit sizing apparatus embodying one form of the present invention, certain parts being broken away to more clearly illustrate certain details of construction.

Fig. 2 is an enlarged side elevation of a portion of the apparatus shown in Fig. 1.

Fig. 3 is a sectional view through one gradeway of the apparatus taken in a plane indicated by the line 3—3 in Fig. 2.

Fig. 4 is a plan view of the feed end of a sizing apparatus similar to Fig. 1 but embodying an alternative form of the invention.

Fig. 5 is a side elevation of a portion of the apparatus shown in Fig. 4.

Fig. 6 is a partial sectional view taken in a plane indicated by the line 6—6 in Fig. 5.

The present invention is especially useful in connection with fruit sizers of the divergent gradeway type in which the fruit is conveyed between a pair of endless carriers arranged in spaced apart longitudinally divergent relation so that the pieces of fruit are released at various points along the gradeway in accordance with their sizes, by the divergence of the carriers, and I have illustrated the invention as embodied in a machine of this type.

Referring to Figs. 1 to 3 inclusive, the apparatus illustrated has a suitable framework including the several supporting standards 6 which are connected by suitable transverse members 7, and to which are secured the longitudinally extending side rails 8. A center rail 9 extends between the side rails 8, and the rails 8 and 9 are respectively provided with downwardly projecting inclined grading rails 8' and 9' which cooperate to form twin parallel gradeways of V-shaped, trough-like form.

The machine illustrated is designed to receive the fruit to be graded at its left hand, or feed end, as viewed in Fig. 1. The fruit may be delivered thereto by any suitable means and as it is deposited in the gradeways, it is carried therealong by means of a plurality of endless flexible aprons 11, the upper runs of which overlie and ride along the opposed inclined faces of the central grading rails 9' and the outer grading rails 8'. The aprons 11 may be formed of fabric such as canvas or the like, and are secured to and driven at the same speed by three endless chains 12, the two outermost of which travel in channels formed in the rails 8, and the middle one of which runs in a suitable groove along the top of the center rail 9.

All three chains 12 are trained around respective upper and lower sprockets 13 and 14 (Fig. 2) secured on respective shafts 15 and 16, which are journalled by similar bearings 17 carried by the end standards 6. The chains 12 are also entrained over similar sprockets at the opposite end of the machine which is not shown, where they are driven from a suitable source of power so that the chains and aprons move in the direction indicated by the arrows.

Inasmuch as fruit sizing machines employing divergent carriers are well known to the art, it has been deemed sufficient, for purposes of this disclosure, to illustrate only so much of the machine as necessary to disclose the constructional features comprising the present invention, and their manner of cooperation with the rest of the machine. It will be understood, however, that the spacing of the grading rails 8' and 9' is so adjusted that the width of the gradeways formed thereby progressively increases, so that as the fruit is carried along the gradeways, the individual pieces are released at various points therealong according to their size. As the fruit is thus released, it may be received upon conveyor belts 21 which extend beneath the gradeways, being mounted on the framework by suitable pulleys 22, and being driven in the same direction and preferably at the same speed as aprons 11. Distribution of the fruit to the packing bins 23 from the belts 21, may be effected by means of shunts 24 extending diagonally across the belts. For purposes of convenience, only two packing bins of conventional construction are illustrated, one with each gradeway, but it will be understood that additional bins may be, and generally are provided in practice.

In the use of divergent type gradeways of the character described, for sizing such fruits as lemons, pears and the like, it is highly important that the pieces of fruit be uniformly positioned in the gradeways to rest upon their smallest diameters with their longitudinal diameters lengthwise of the gradeways. In the first place, it will be apparent that as the pieces of fruit are positioned crosswise of the gradeway, they will be graded according to their lengths, whereas the size of the fruit for commercial purposes is identified by its smallest diameter irrespective of the length. Secondly, unless all of the pieces of fruit are uniformly positioned in this manner, those which lie crosswise of the gradeway will obviously be carried past their proper point of discharge and be discharged with the larger fruit, thereby intermixing the sizes.

The present invention effectively meets this problem by the provision of a preliminary fruit positioning mechanism over which the fruit is passed in advance of the sizing operation, and which is operable to agitate the fruit in such manner that any pieces lying crosswise of the gradeway are turned about to lie lengthwise thereof, on their smallest diameters, with the result that all of the pieces of fruit are properly and uniformly positioned for accurate sizing. For purposes of convenience, the construction of the positioning mechanism associated with but one of the gradeways only, will be described, it being understood that each gradeway is provided with a similar mechanism both of which are alike in construction, so that an understanding of one will suffice for both. It will also be understood that one or more gradeways may be employed as desired.

In the form of the invention illustrated in Figs. 1 through 3, each positioning mechanism includes a pair of opposed shaker plates 31 mounted for operation in cut-away portions of the stationary grade rails 8' and 9', and arranged in V-shaped relation so as to form a section of the gradeway over which the fruit is carried by the endless aprons 11. The shaker plates 31 are parallel, however, so that no sizing is effected thereby, and in addition the section of the grading rails 8' and 9' in advance of the shaker plates are also preferably parallel to form a preliminary non-sizing section for receiving the fruit prior to its passage over the positioning mechanism. The preliminary non-sizing section of the gradeway section of the gradeway in advance of the positioning mechanism may be dispensed with if desired and the fruit delivered directly to a section of the gradeway formed by the positioning mechanism.

The shaker plates are mounted adjacent their ends by respective V-shaped brackets 32 which are secured on a short longitudinally extending rocker shaft 33 mounted directly beneath the gradeway, and journalled at its ends in bearings 34 on standards 6. Each bracket 32 is provided with a downwardly extending arm 36, which is pivotally connected by means of a pin 37, with a pitman 38 having a bearing portion 39 intermediate its length journalled on an eccentric 41, which is secured on a shaft 42 serving as a common drive for both positioning mechanisms. The shaft 42 is supported adjacent its ends in bearings 43 on transverse members 7, and is connected at its forward end with the drive shaft of an electric motor 44. From the above description, it will be seen that rotation of the shaft 42 and eccentrics 41, effects oscillation of the brackets 32 and shaker plates 31, so that the aprons 11 are vibrated transversely of the gradeway as they travel over the shaker plates. By this means, the pieces of fruit supported between the aprons are agitated as they pass over the shaker plates, and are thereby caused to turn lengthwise of the gradeway and settle down between the aprons to a position where they are supported at their smallest diameters. For example, a piece of fruit such as a lemon, would be repositioned from a dotted line position as illustrated in Fig. 3 to the full line position shown. The rate of vibration of the shaker plates can be varied over a considerable range, but it may be stated that a speed of the shaft 42 to effect 575 vibrations per minute gives very good results.

In the embodiment illustrated in Figs. 4 through 6, the sizer proper is, in general, the same as that shown in Figs. 1 to 3 but embodies an alternative form of positioning mechanism in which the movable sections of the gradeway are formed by rolls 51 mounted in cutaway portions of the stationary grade rails 8' and 9'. The rolls 51 have a similar number of radially extending longitudinal vanes 52, which are spaced at equal intervals around the periphery of each of the rolls. Vanes 52 are preferably yieldable, and may be constructed of resilient material such as soft rubber. The aprons 11 hang over the rolls 51 and have their roller edges received between and guided by strips 53 of yieldable material such as rubber, which are secured along the flanges of channel members 54 suitably mounted on transverse members 7 of the framework.

Rolls 51 are provided with shafts 56 journalled at their ends in bearings 57 of arms 58, which are adjustably mounted on brackets 59 in such manner as to provide for both vertical and lateral adjustment of the rolls with respect to the aprons. As best seen in Fig. 6, each bracket 59 is of U-shaped configuration, formed by a pair of upstanding arms 60 interconnected by a horizontal section which is provided with bearings at each end by which the brackets are mounted on shafts 61 journalled in bearings 62 on the transverse members 7, the bearing portions of the bracket 59 being held in place between the bearings 62, and collars 63 secured to the shafts 61. Each of the bracket arms 60 is provided with transverse slots 67 for registration with vertical slots 68 in the supporting arms 58, and bolts 69 are provided to clamp the arms 58 in selected positions of adjustment on the bracket arms 60. By virtue of such adjustable mounting, the position of the rolls 51 can be readily adjusted for use for different sizes and varieties of fruit.

As seen in Fig. 6, rolls 51 have their vanes positioned for alternate engagement with the respective aprons with which they are associated, and for this purpose are interconnected for synchronous operation. The shaft 56 of each roll carries a sprocket 71 which is connected by chain 72 with a drive sprocket 73 on the associated shaft 61. Each chain 72 also engages an idler sprocket 74 which is adjustably mounted on transverse frame member 7 to maintain the tension of the chains 72 in any adjusted position of the associated roll. Toward the feed end of the apparatus, shafts 61 are extended and carry large gears 76 which are interconnected by idler pinions 77, 78, one of the shafts 61 having driving connection with the motor 79 which is mounted on a platform 80 carried by the frame.

The drive is such that the rolls are rotated in opposite directions as indicated by the arrows in Fig. 6, so that the vanes in engaging the aprons 11 travel downwardly to effect a wiping action on the aprons while at the same time they effect oscillation thereof. The vanes are so spaced on the respective rolls that when one apron is being moved by a vane the opposite apron is engaged with its associated roll. Thus the opposed aprons 11 of the gradeway are moved alternately in opposite directions to effect agitation of the fruit carried thereby so that the fruit will be repositioned to be supported at its smallest diameter. Good results may be obtained over quite a range of speeds of the rolls 51, but 120 R. P. M. may be stated as an example of one speed at which the rolls may be driven with satisfactory results.

While I have described my invention in connection with certain preferred embodiments thereof, it is to be understood that the invention is capable of variation and modification, and can be embodied in other forms without departing from the scope of my invention, and I deem myself entitled to all such variations and modifications as come within the scope of the claims appended hereto.

Having now described my invention and in what manner the same may be used, what I claim and desire to protect by Letters Patent is:

1. In a machine for sizing fruit or the like, a pair of endless longitudinally divergent travelling aprons arranged in troughlike relation to support and convey pieces of fruit therebetween, a pair of rolls beneath said aprons and provided with yieldable vanes for engagement therewith, and means for driving said rolls to agitate the aprons by the action of said vanes.

2. In a machine for sizing fruit or the like, a pair of endless longitudinally divergent travelling aprons arranged in troughlike relation to support and convoy pieces of fruit therebetween, a pair of rolls beneath said aprons and provided with yieldable vanes for engagement therewith, and means for driving said rolls in opposite directions and in timed relation to effect alternate engagement of said vanes with the respective aprons with which they are associated.

3. In a sizer for fruit and the like, means forming a trough-like gradeway, a conveyor comprising opposed flexible aprons movable along the sides of said gradeway, means for vibrating said conveyor to reposition fruit supported thereby comprising opposed movable elements in said gradeway for engagement with said aprons, and means mounting said elements for both vertical and lateral adjustment relative to said aprons.

4. In a sizer for fruit and the like, means forming a trough-like gradeway having a longitudinally divergent sizing section and a preliminary non-divergent section in advance thereof, stationary track means along each side of said gradeway, means for conveying fruit along said gradeway comprising endless driving means engaging the respective track means for travel therealong and opposed flexibile aprons connected at their outer edges to said respective driving means and depending therefrom to cover said gradeway and carry a single file of fruit therealong, a shaking mechanism associated with the depending portions of said aprons in the preliminary section of said gradeway for effecting vibration thereof in a direction laterally transverse to the gradeway without changing the width of the trough formed therebetween, and means for operating said shaking mechanism whereby to effect uniform positioning of the pieces of fruit carried by said aprons in advance of their movement over the sizing section.

5. In a sizer for fruit and the like, means forming a trough-like gradeway, stationary track means along each side of said gradeway, means for conveying fruit along said gradeway comprising endless driving means engaging the respective track means for travel therealong and opposed flexible aprons connected at their outer edges to said respective driving means and depending therefrom to cover said gradeway and carry a single file of fruit therealong, a shaking mechanism associated with the depending portions of said aprons in the forward end of said gradeway for effecting vibration thereof in a direction laterally transverse to the gradeway without changing the width of the trough formed therebetween, and means for operating said shaking mechanism whereby to effect uniform positioning of the pieces of fruit carried by said aprons.

6. In a sizer for fruit and the like, means forming a trough-like gradeway having a longitudinally divergent sizing section and a preliminary non-divergent section in advance thereof, stationary track means along each side of said gradeway, means for conveying fruit along said gradeway comprising endless driving means engaging the respective track means for travel therealong and opposed flexible aprons connected at their outer edges to said respective driving means and depending therefrom to cover said gradeway and carry a single file of fruit therealong, and vibrating means associated with the depending portions of said aprons in the preliminary section of said gradeway for effecting relative back and forth motion thereof in a direction laterally transverse to the gradeway to effect uniform positioning of the pieces of fruit carried by said aprons in advance of their movement over the sizing section.

7. In a sizer for fruit and the like, means forming a trough-like gradeway having a longitudinally divergent sizing section and a preliminary non-divergent section in advance thereof, stationary track means along each side of said gradeway, means for conveying fruit along said gradeway comprising endless driving means engaging the respective track means for travel therealong and opposed flexible aprons connected at their outer edges to said respective driving means and depending therefrom to cover said gradeway and carry a single file of fruit therealong, and means forming at least a part of said preliminary gradeway section for effecting a relative back and forth motion of the depending portions of said aprons in a direction laterally transverse to the gradeway to effect uniform positioning of the pieces of fruit carried by said aprons in advance of their movement over the sizing section.

8. A machine for uniformly positioning elongated fruits, such as lemons, pears and the like, comprising a pair of endless travelling aprons of limply flexible material, means for supporting said aprons in angular trough-like relation so that each apron forms one wall of a travelling trough adapted to receive and support a file of fruit deposited therein; means for operating said aprons comprising endless carriers to which the upper edges of said aprons are attached, and vibratory means for imparting lateral vibratory movement to at least one of said aprons transversely of said trough and below said attached edge, said carriers holding the upper edge of said aprons against said vibratory movement.

9. In a machine for sizing fruit or the like, a pair of endless longitudinally divergent travelling aprons arranged in trough-like relation to support and convey pieces of fruit therebetween; a pair of rolls beneath said aprons and provided with vanes for engagement therewith, and means for driving said rolls to agitate the aprons by the action of said vanes.

FRED STEBLER.